United States Patent [19]

Mori et al.

[11] Patent Number: 5,189,578
[45] Date of Patent: Feb. 23, 1993

[54] DISK SYSTEM WITH SUB-ACTUATORS FOR FINE HEAD DISPLACEMENT

[75] Inventors: Kenji Mori, Tsuchiura; Hiromu Hirai, Tsukuba; Haruaki Otsuki, Toride; Tsuyoshi Takahashi, Odawara; Jun Naruse, Odawara; Yuji Nishimura, Odawara; Muneo Kawamoto, Ibaraki, all of Japan

[73] Assignee: Hitachi, Ltd., Tokyo, Japan

[21] Appl. No.: 543,425

[22] Filed: Jun. 26, 1990

[30] Foreign Application Priority Data

Jun. 28, 1989 [JP] Japan .................. 1-164041

[51] Int. Cl.5 ............... G11B 21/08; G11B 21/24; G11B 21/10
[52] U.S. Cl. .................... 360/106; 360/109; 360/77.02; 360/78.05; 360/98.01
[58] Field of Search .......... 360/106, 105, 77.02, 360/77.05, 78.05, 78.12, 98.01, 109, 104, 97.01, 97.02, 97.03

[56] References Cited

U.S. PATENT DOCUMENTS

| | | | |
|---|---|---|---|
| 3,924,268 | 12/1975 | McIntosh et al. | 360/97.01 |
| 4,068,267 | 1/1978 | Inouye | 360/77.05 |
| 4,121,265 | 10/1978 | Dere | 360/78.05 |
| 4,188,645 | 2/1980 | Ragle et al. | 360/104 |
| 4,374,402 | 2/1983 | Blessom et al. | 360/109 |
| 4,481,550 | 11/1984 | Miller et al. | 360/77.06 |
| 4,539,608 | 9/1985 | Hill et al. | 360/77.05 |
| 4,764,829 | 8/1988 | Makino | 360/106 |
| 4,814,908 | 3/1989 | Schmitz | 360/109 |
| 4,858,040 | 8/1989 | Hazebrouck | 360/109 |
| 4,963,806 | 10/1990 | Shimohara et al. | 360/77.05 |
| 4,989,109 | 1/1991 | Morisawa | 360/109 |

FOREIGN PATENT DOCUMENTS 51-36924 3/1976 Japan .
62-75988 7/1987 Japan .

Primary Examiner—John H. Wolff
Assistant Examiner—Craig A. Renner
Attorney, Agent, or Firm—Antonelli, Terry, Stout & Kraus

[57] ABSTRACT

A magnetic disk system utilizes both a voice coil motor and a piezoelectric element provided on a head supporting arm to precisely position a head to a predetermined position on a disk. The piezoelectric element is built in the distal end portion of the head supporting arm and is restricted in respect of its movement by a resilient mechanism which has low rigidity in the driving direction of the piezoelectric element and high rigidity in the other directions. The resilient mechanism is formed by pairs of doubled parallel leaf springs so arranged that each pair is disposed on either side of the piezoelectric element.

5 Claims, 12 Drawing Sheets

VOLTAGE APPLIED TO PIEZOELECTRIC ELEMENT

OUTPUT DISPLACEMENT CHARACTERISTIC OF PIEZOELECTRIC ELEMENT

VOLTAGE PATTERN I APPLIED TO PIEZOELECTRIC ELEMENT

VOLTAGE PATTERN II APPLIED TO
PIEZOELECTRIC ELEMENT

OUTPUT DISPLACEMENT CHARACTERISTIC
OF PIEZOELECTRIC ELEMENT

ROTATING DIRECTION OF DISK

DISK SYSTEM WITH SUB-ACTUATORS FOR FINE HEAD DISPLACEMENT

BACKGROUND OF THE INVENTION

1. Field of the Invention

The present invention relates to an information recording device for recording or reproducing information magnetically or optically, for example, and, more particularly, to a disk system equipped with sub-actuators for driving a plurality of heads in fine or short strokes independently of one another, in addition to a main actuator for driving those heads together in a long stroke.

2. Description of the Prior Art

Generally, a typical magnetic disk system includes a plurality of magnetic disks on which information is to be stored (recorded), and is equipped with a plurality of magnetic heads for writing and reading information on and from those magnetic disks, and a main actuator such as a voice coil motor for positioning the magnetic heads.

More specifically, the plurality of heads are mounted on a carriage via respective head arms so that the heads are driven together by the voice coil motor. In this case, the heads are usually positioned in accordance with the so-called servo-plane servo system arranged such that any one of the disk surfaces is defined as a servo surface storing thereon positioning information, other disk surfaces are defined as disk surfaces storing thereon data information, and the heads for the data surfaces (i.e., the data heads) are positioned based on the positioning information derived from the head for the servo surface (i.e., the servo head).

However, the above mentioned system has a problem of the so-called "thermal off-track" that the servo head and the data heads are offset due to a difference in coefficient of thermal expansion between respective component parts when there occurs a temperature difference between the points in time of writing and reading information, or that the similar offset takes place due to uneven temperature distribution during operation.

Correction of such thermal off-track becomes increasingly important because the gap between adjacent storage tracks has narrowed in recent years with an increase in the recording density.

As one means for achieving the correction of the thermal off-track, Japanese Unexamined Patent Publication No. 51-36924 or No. 62-75988, for example, discloses a system which includes, in addition to a main actuator (e.g., a voice coil motor) for moving a plurality of heads together in a long stroke, subactuators (e.g., piezoelectric elements) for finely positioning the individual heads independently of one another.

However, the magnetic disk unit is subjected to severe operating and environmental conditions in which acceleration of the head access driving is so very so large as to frequently apply acceleration on the order of more than several tens G to the head section, and the internal temperature is changed over a wide range of from several ° C. to several tens ° C., for example, dependent on the rest or continuously working state. However, piezoelectric elements are known to be extremely strong against compressive stress, but weak against tensile, bending and shearing stresses. For this reason, special care is needed to ensure reliability in the case of using piezoelectric elements.

Further, for positioning the heads with high accuracy, it is also needed to sufficiently take into account the characteristics of piezoelectric elements.

The prior art has not paid thorough consideration to those points and still has room for improvement from the standpoint of practical use.

SUMMARY OF THE INVENTION

An object of the present invention is to provide a more practical information recording device or disk system which has a function of finely driving heads.

Another object of the present invention is to provide an information recording device or disk system which is compact and highly accurate Still another object of the present invention is to provide an information recording device or disk system which can position the heads at a high speed.

The above objects are achieved by the following means:

(1) A fine displacement element is incorporated in the distal end portion of a support for supporting a head and restricted in its movement by resilient means which has a low rigidity in the driving direction of the element and a high rigidity in the other directions. Practically, the resilient means may be constituted by, for example, two pairs of doubled parallel leaf springs or one pair of uneven parallel leaf springs with each pair or each leaf spring provided on either side of the fine displacement element.

(2) The fine displacement element is fixedly bonded to the distal end portion of the guide arm at a temperature above the upper limit value of the internal temperature of the disk unit during operation thereof.

(3) A dummy element is incorporated in the servo head arm as well and the servo head arm has the same mechanical structure as those of the other data head arms.

(4) A drift compensating circuit for the fine displacement element is provided in a correction amount setting circuit which is adapted to correct an offset of each data head based on position information of the data head.

Other objects as well as the structures and features of the present invention to achieve those objects will be apparent from the following description.

DETAILED DESCRIPTION OF PREFERRED EMBODIMENTS

Hereinafter, preferred embodiments of the present invention will be described with reference to the drawings.

FIGS. 1, 2, 3 and 4 show a first embodiment of the present invention in which the invention is applied to a magnetic disk system.

Figure 1:
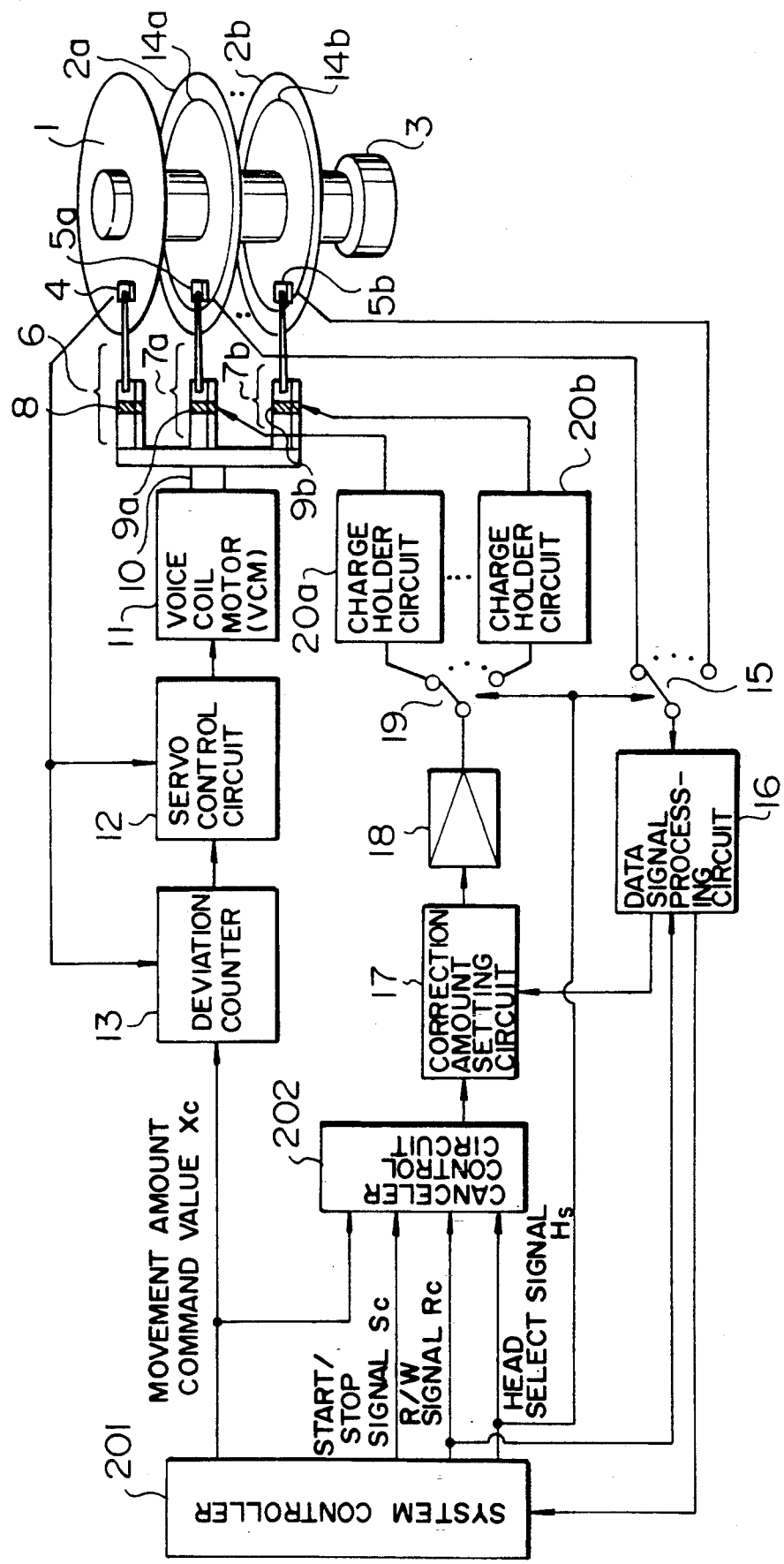
FIG. 1 is a block diagram showing a system according to one embodiment of the present invention.

A large capacity magnetic disk system usually includes a plurality of disks for magnetic recording. In FIG. 1, designated by reference 1 is a servo disk (a so-called "servo surface"), 2a and 2b are a plurality of data disks (so-called "data surfaces" for recording data information) and 3 is a spindle motor for rotating the plurality of disks together at a high speed. Further, 4 is a servo head for reading servo information, 5a and 5b are data heads for writing and reading the data information, 6, 7a and 7b are head arms for supporting the respective heads, and 8, 9a and 9b are fine displacement elements respectively built in the respective head arms to finely drive the corresponding heads on the order of 1–10 $\mu$m, each fine displacement element being formed of a piezoelectric element. Designated by 10 is a carriage for holding the respective base portions of the head arms together, and 11 is a voice coil motor (VCM) for moving the carriage 10 in a long stroke at a high speed. Note that this embodiment employs a system of performing an access operation of the respective heads by a linear type VCM. 12 is a VCM servo control circuit for controlling the VCM 11, and 13 is a deviation counter. Moreover, 14a and 14b are reference tracks recorded on the data surfaces 2a and 2b, respectively, 15 is a head output selector switch for one of output signals from the data heads, 16 is a data signal processing circuit, 17 is a correction amount setting circuit for calculating and setting the correction amount for positioning of each data head, 18 is an amplifier for driving the piezoelectric element, 19 is a piezoelectric element selector switch for selecting the piezoelectric element to be driven in response to a head select signal Hs, and 20a and 20b are charge holder circuits each holding an electric charge applied to the corresponding piezoelectric element for a certain period of time.

In addition, designated by 201 is a system controller and 202 is a canceler control circuit which receives a start/stop signal Sc from the system controller 201.

Operation of the first embodiment of the present invention will be described below with reference to FIG. 1.

During operation of the magnetic disk system, the VCM servo control circuit 12 switches between a high-speed seek mode to access the data position and a following mode to follow the track based on a movement amount command value Xc given by the system controller 201 and drives the VCM 11 upon feedback of the head position information from the servo head 4. At this time, the data heads 5a and 5b are also driven and positioned together with the servo head 4. This system is the so-called "servo-surface servo system".

However, that system suffers from a problem of the so-called "thermal off-track" that the servo head 4 and the data heads 5a and 5b are offset due to a difference in coefficient of thermal expansion between respective component parts when there occurs a temperature difference between times of writing and reading information, or that a similar offset is produced due to uneven temperature distribution during the operation.

In this embodiment, therefore, the position information (i.e., the reference tracks 14a, 14b) recorded on the data surfaces 2a and 2b are read by the data heads 5a and 5b for each certain period of time, respectively, and are compared with the servo position information recorded on the servo surface to calculate the off-track amounts of the respective data heads 5a and 5b. The resulting off-track amounts are stored in the correction amount setting circuit 17, and electric charges corresponding to the correction amounts of the data heads are supplied to the piezoelectric elements 9a and 9b, respectively, via the amplifier 18 and the piezoelectric element selector switch 19. In this connection, the respective displacements (i.e., the correction amounts) of the data head arms imparted by the piezoelectric elements 9a and 9b are held for a certain period of time through actions of charge holder circuits 20a and 20b.

Note that the correction amount setting circuit 17 includes a drift compensating circuit adapted to compensate for a drift phenomenon of each piezoelectric element. By repeating the above operation at intervals of a certain period of time, the data heads are corrected in respect of their off-track state at all times.

Because the coefficient of thermal expansion of the material of the head arm (e.g., $23\times10^{-6}$ deg$^{-1}$ for aluminum) is greatly different from that of the piezoelectric element (e.g., $-6\times10^{-6}$ deg$^{-1}$ for typical PZT), the head arm incorporating a piezoelectric element and the head arm incorporating no piezoelectric element are significantly offset at their distal end positions (i.e., the head positions) under a condition in which the temperature changes to a large extent. To solve this problem, in this embodiment, the piezoelectric element 8 serving as a dummy is built also in the servo head arm 6 to assure that it has the same mechanical structure as that of the data head arms 7a and 7b.

Incidentally, the plus and minus terminals of the dummy piezoelectric element 8 built in the servo head arm 6 are short-circuited so as to produce no potential difference therebetween.

Any magnetic disk system usually includes a multiplicity of data heads which should be driven independently of one another. But, it is not preferable from the standpoint of cost to provide separate amplifiers for driving the piezoelectric elements built in respective data head arms. In this embodiment, therefore, the piezoelectric element selector switch 19 and the charge holder circuits 20a and 20b are provided to drive the multiplicity of piezoelectric elements by the single amplifier 18, thereby reducing the cost.

Further, the canceler control circuit 202 functions to fix the applied voltage based on a read/write (R/W) signal Rc from the system controller 201 for thereby avoiding the occurrence of electric noise from electrodes and wires of each piezoelectric element during a reading/writing step.

Although a piezoelectric element is used as the fine displacement element in the foregoing embodiment, the present invention can also be implemented in a similar manner by using another element (e.g., a magnetic strain element). Namely, any element is applicable so long as it expands and contracts upon receipt of an electromagnetic signal.

Also, the foregoing embodiment has been explained as employing the so-called "servo-surface servo system" as an example. In the case where the present invention is applied to other type of data-surface servo system, such as a sector servo system in which the position information is recorded in each track of the data surface, however, if the movement amount command value Xc from the system controller 201 is within N tracks not greater than the stroke of the fine displacement actuator (element), it becomes possible to carry out a seek operation solely by the fine displacement actuator and hence to achieve the seek operation at a very high speed. In this case, the following operation can also be achieved solely by the fine displacement actuator.

Figure 2:
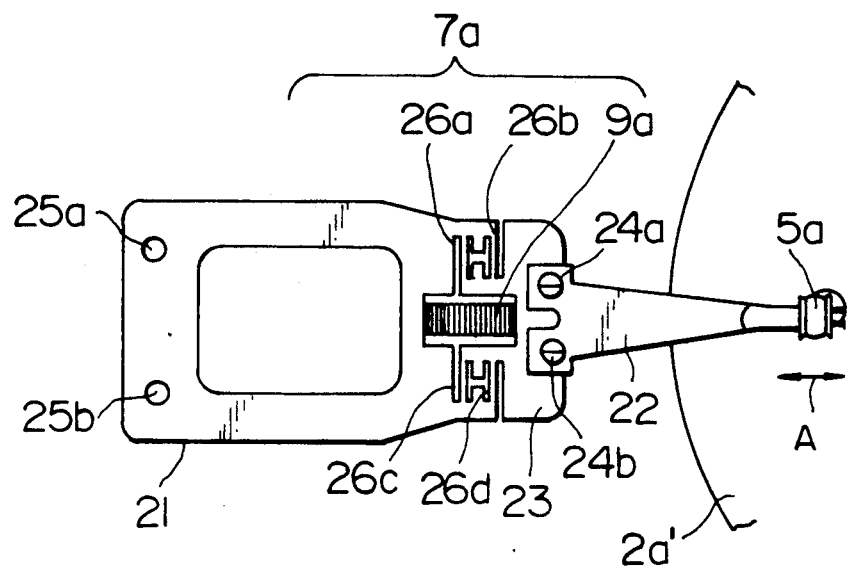
FIGS. 2 and 3 are a plan view and a front view showing details of a head arm shown in FIG. 1, respectively.
Figure 3:
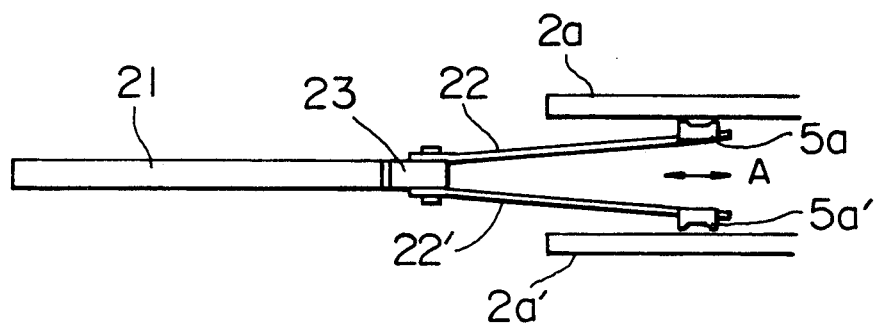

Next, FIGS. 2 and 3 are a plan view and a front view, respectively, showing details of the head arm with the piezoelectric element therein according to the first embodiment of the present invention.

In these drawings, designated by 2a and 2a' are the data disks and 7a is the head arm. The head arm 7a comprises a guide arm 21 and a pair of load arms 22 and 22'. The load arms 22 and 22' are formed of sheet-like resilient members and are attached to the distal end portion of the guide arm by screws 24a and 24b, respectively, so that the heads 5a and 5a' provided at the distal ends of the load arms are pressed against the respective disk surfaces with a predetermined pressing force. The guide arm 21 is fixed to the carriage 10 via screw holes 25a and 25b.

The distal end portion 23 of the guide arm is finely driven by a piezoelectric element 9a while being guided in directions A by resilient means comprising pairs of parallel leaf springs 26a, 26b and 26c, 26d (the resilient means being hereinafter referred to as doubled parallel leaf springs) with each pair of springs being provided on either side of the piezoelectric element 9a. The doubled parallel leaf springs restrict the movement of the piezoelectric element in the directions A with appropriate rigidity dependent on the leaf spring thickness, but have very high rigidity in the directions other than A. This is effective to prevent the piezoelectric element from being subjected to bending and shearing stresses and hence to improve reliability.

Figure 4:
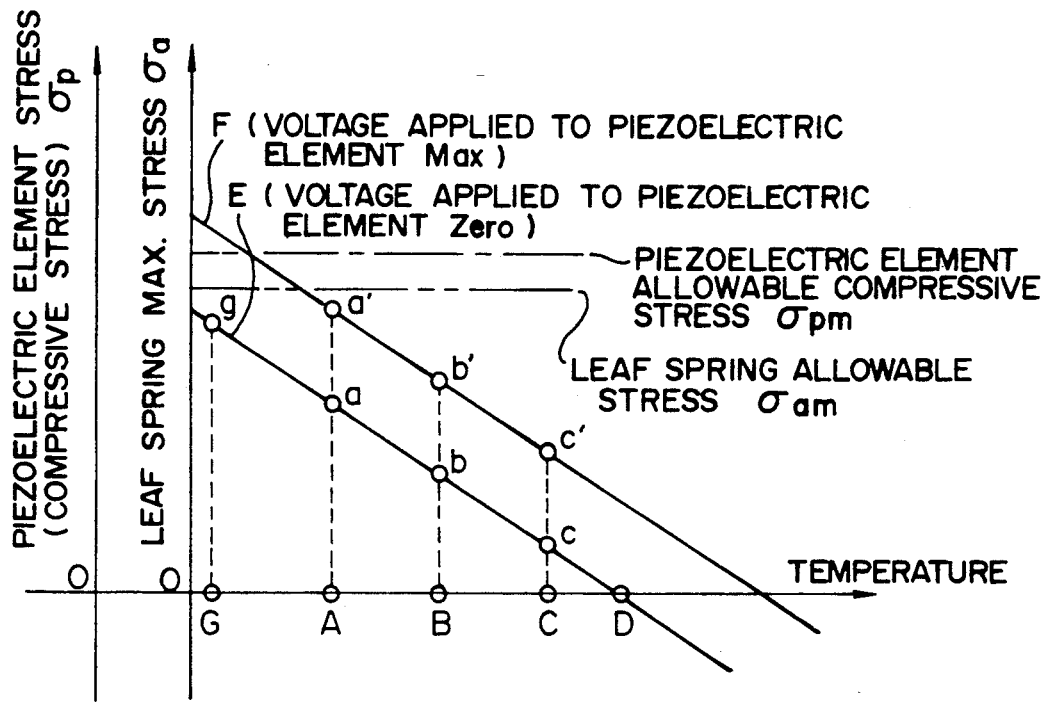
FIG. 4 is a graph for explaining the manner of incorporating a piezoelectric element.

FIG. 4 is a graph showing the relationship between temperature and stresses imposed on the piezoelectric element and the leaf springs, in order to explain the manner of incorporating the piezoelectric element according to the first embodiment of the present invention. In the graph, a point A represents the lower limit value of the internal temperature of the disk system during operation thereof, a point B represents a normal temperature during operation of the disk system, a point C represents the upper limit value of the internal temperature of the disk system during operation thereof, a point D represents a bonding temperature at which the piezoelectric element is bonded to the guide arm 21, and a point G represents the lower limit value of the internal temperature of the disk system when it is not operated.

For reduction in weight, the guide arm is made of an aluminum alloy which has a coefficient of thermal expansion $\alpha a$ on the order of $23 \times 10^{-6}$ (deg$^{-1}$), for example. On the other hand, the piezoelectric element fabricated by laminating PZT (lead zirconate titanate) as a typical material for piezoelectric elements has the coefficient of thermal expansion $\alpha p$ on the order of $-6 \times 10^{-6}$ (deg$^{-1}$), for example. Accordingly, when the piezoelectric element is bonded at a high temperature corresponding to the point D and the temperature is lowered from a non-stressed condition, the aluminum alloy is contracted, while the piezoelectric element is expanded, whereby compressive stress is formed in the piezoelectric element an bending stress is imposed on the leaf springs of the guide arm 21. As a result, in the case where the voltage applied to the piezoelectric element is zero, the compressive stress $\sigma p$ imposed on the piezoelectric element and the maximum value of bending stress $\sigma a$ imposed on the leaf springs dependent on temperature changes are represented by a linear line E in FIG. 4. Note that points a, b, c and g indicate stress values on the linear line E at the temperature A, B, C and G, respectively.

In the case where the maximum voltage is applied to the piezoelectric element, the piezoelectric element expands, so that the compressive stress imposed on the piezoelectric element and the bending stress imposed on the leaf springs are further increased. The respective stresses dependent on temperature changes in this case are represented by a linear line F in FIG. 4. Note that points a', b', c' and g' indicate stress values on the linear line F at the temperatures A, B, C and G respectively.

Further, a one-dot chain line in FIG. 4 represents the allowable compressive stress $\sigma pm$ of the piezoelectric element and a two-dot chain line represents the allowable stress $\sigma am$ of the leaf springs.

This embodiment is effective to improve reliability and durability based on the following points:

(1) Since the bonding temperature of the piezoelectric element is set (e.g., approximately 60°-85° C.) above a range of the operating temperature, the piezoelectric element and the bonding region are prestressed or subjected to compressive stress in advance of operation throughout the operating temperature range (i.e., A-C). This improves reliability and durability of the piezoelectric element and bonding region.

(2) By designing the configuration and size (length and thickness) of the leaf springs and the cross-sectional area of the piezoelectric element such that when the maximum voltage is applied to the piezoelectric element at the lower limit value A of operating temperature (i.e., at the point a' in FIG. 4), the stress a imposed on the leaf springs to lower than the allowable stress $\sigma am$ thereof and the compressive stress $\sigma p$ imposed on the piezoelectric element is lower than the allowable compressive stress $\sigma pm$ thereof, durability of the leaf springs and the piezoelectric element can be improved.

(3) By designing the configuration and size (length and thickness) of the leaf springs and the cross-sectional area of the piezoelectric element such that when the voltage applied to the piezoelectric element is zero at the lower limit value g of the temperature in the non-operating state (i.e., at the point g in FIG. 4), the stress $\sigma a$ imposed on the leaf springs is lower than the allowable stress $\sigma am$ thereof and the compressive stress $\sigma p$ imposed on the piezoelectric element is lower than the allowable compressive stress $\sigma pm$ thereof, durability of the leaf springs and the piezoelectric element can be improved.

In this connection, the allowable compressive stress of the piezoelectric element is usually so great that it is only required to principally take into account the stress imposed on the leaf springs in normal cases.

Figure 5:
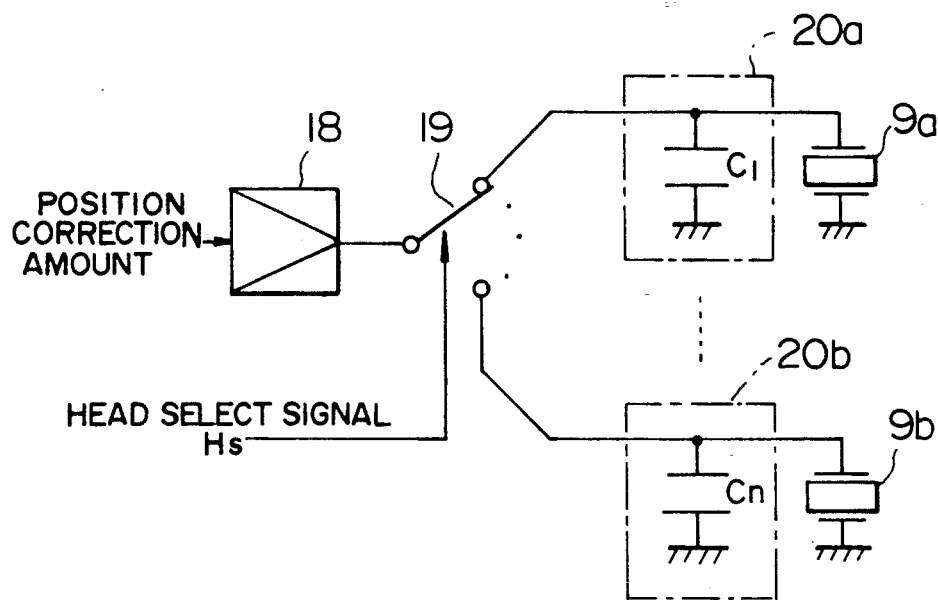
FIG. 5 is a diagram of a charge holder circuit shown in FIG. 1.

FIG. 5 shows a part of a drive circuit according to the first embodiment of the present invention, in which the same reference numerals as those in FIG. 1 designate the same components. In this embodiment, the charge holder circuits 20a and 20b have the simplest structures comprising capacitors $C_l$ and $C_n$ arranged in parallel to the piezoelectric elements 9a and 9b, respectively.

Operation of the circuit shown in FIG. 5 will be described below. The amplifier 18 supplies a voltage dependent on position co section amounts of the respective data heads through the piezoelectric element selector switch 19 to the corresponding piezoelectric element, for example, the piezoelectric element 9a, which has been selected by the head select signal Hs, thereby displacing the data head 5a. At a next point of time, even if the piezoelectric element selector switch 19 is changed over to select the piezoelectric element 9b, for example, the electric charge is held by a characteristic of the piezoelectric element 9a itself and a capacitance characteristic of the parallel capacitor 20a and, simultaneously, the displacement amount of the piezoelectric element 9a is also held. In practice, the displacement amount is gradually reduced due to a slight leakage current with the elapse of time. However, an experiment has proved that the electric charge can be held for a time constant of more than ten minutes, even if the piezoelectric element is provided with no parallel capacitor.

With this embodiment, therefore, the plurality of piezoelectric elements can be driven by a single amplifier and the cost can therefore be reduced greatly.

Another embodiment of the present invention will be described below with reference to FIGS. 6 and 7. In this embodiment, the distal end portion of the guide arm 21 and the resilient means are divided into two parts in the direction of the thickness thereof and piezoelectric elements are provided in the divided parts, respectively, allowing upper and lower heads to be driven independently of one another. In these drawings, the same reference numerals as those in FIGS. 2 and 3 designate the same components. More specifically, designated by 5a and 5a' are the data heads, and 22 and 22' are load arms for supporting the respective data heads. Also, 27 is a guide arm for holding the load arms. In this embodiment, the distal end portion of the guide arm 27, including the resilient means comprising the pair of doubled parallel leaf springs, is divided into two parts 28a and 28b in the direction of thickness thereof. Further, 29a and 29b are laminated piezoelectric elements capable of expanding and contracting in the directions of arrows $B_1$ and $B_2$ shown in FIG. 7 to independently drive the divided distal end portions 28a and 28b, so that the data heads 5a and 5b can finely be driven in the directions of arrow $B_1$ and $B_2$ independently of each other.

Therefore, this embodiment can provide a valuable advantageous effect of individually correcting off-track states of even those data heads which are mounted on the same guide arm.

Figure 8:
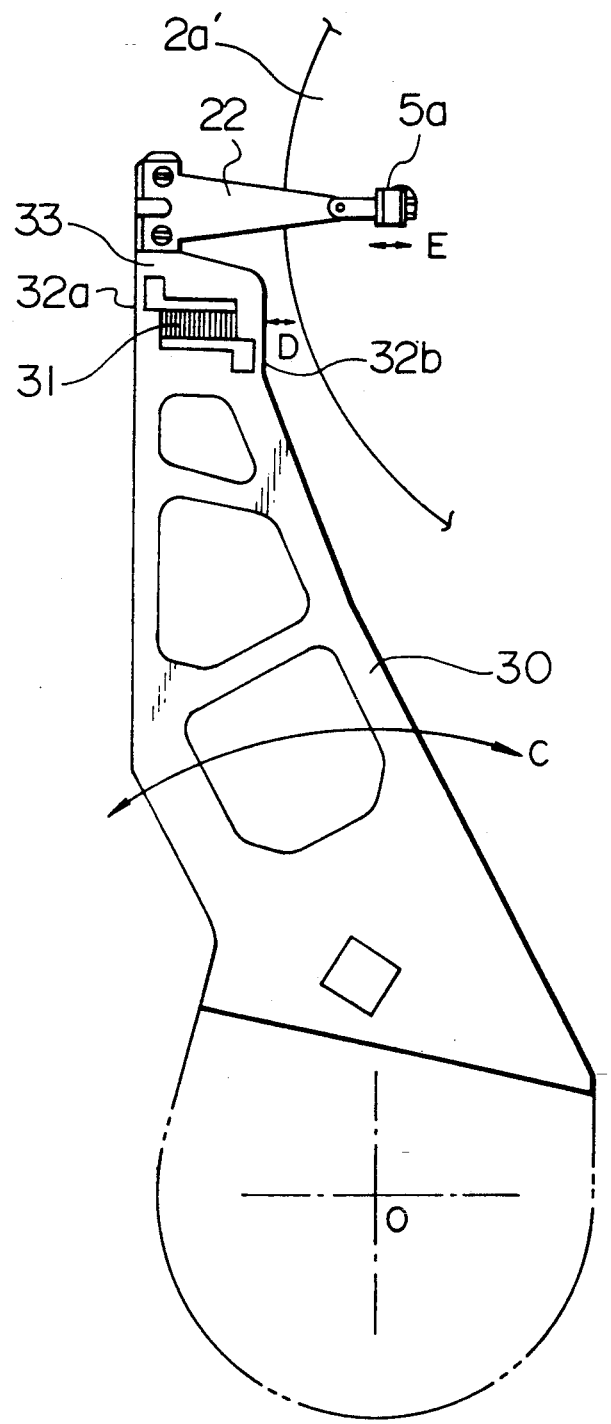
FIG. 8 is a plan view of a head arm of an embodiment in which the present invention is applied to a rotary type head arm.

FIG. 8 is a plan view showing an embodiment of the present invention applied to a system for performing access operation of the respective heads by a rotary type VCM, in which the same reference numerals as those in FIG. 2 designate the same components. More specifically, a guide arm 30 is pivotable about 0 in the drawing and driven by a rotary type VCM (not shown) in the directions of arrow C for performing an access operation of the head 5a. A laminated piezoelectric element 31 is provided on the distal end of the guide arm 30 to perform a fine displacement in the directions of arrow D. A distal end portion 33 of the guide arm 30 is thereby finely driven while being guided by a pair of uneven parallel leaf springs 32a and 32b, to finely drive the head 5a in the directions of arrow E.

With the arrangement of this embodiment, the distal end portion 33 of the guide arm is supported and guided by the parallel leaf springs 32a and 32b disposed in a staggered relation relative to the guide arm 30, and the laminated piezoelectric element 31 is fixed between the parallel leaf springs 32a and 32b. Therefore, this embodiment provides an advantage that the structure of the section incorporating the piezoelectric element is simplified and has high rigidity in the directions other than that of the displacement of the piezoelectric element.

Further, the manner of incorporating the piezoelectric element in this embodiment can be realized with a further improvement in reliability and durability by applying an initial compressive force to the piezoelectric element in the manner explained in connection with FIG. 4.

Figure 6:
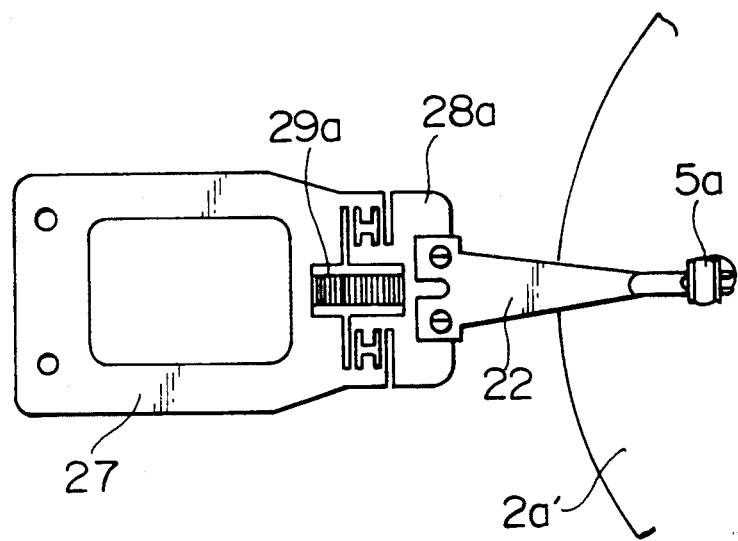
FIGS. 6 and 7 are a plan view and a front view of a head arm of another embodiment of the present invention, respectively.
Figure 7:
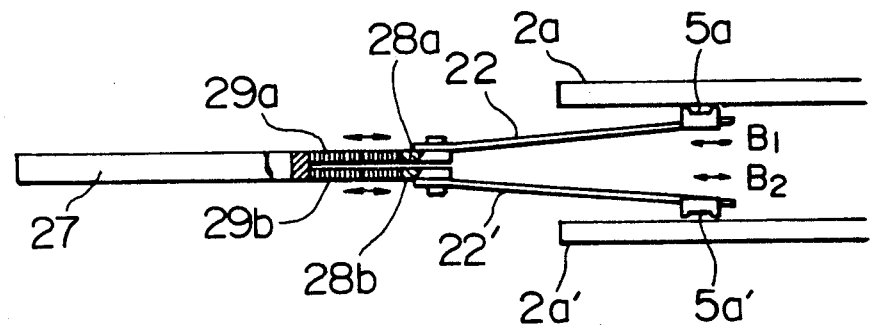

In addition, as in the embodiment shown in FIGS. 6 and 7, this embodiment can also be modified such that the distal end portion 33 of the guide arm and the leaf springs 32a and 32b are each divided into two parts in the direction of the thickness thereof and piezoelectric elements are disposed on the respective divided parts, making it possible to finely drive upper and lower heads independently of each other.

Next, a more detailed embodiment of the correction amount setting circuit 17 shown in FIG. 1 will be described.

Figure 9:
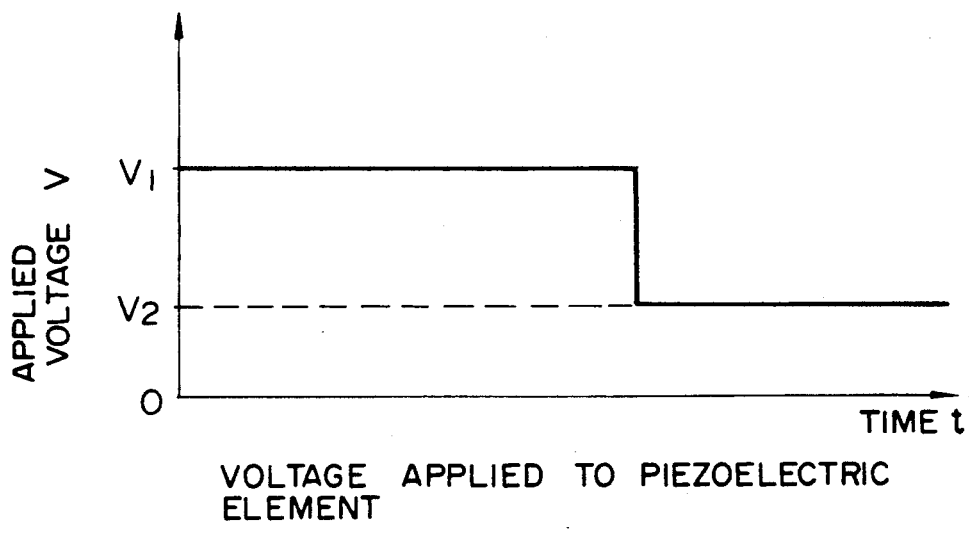
FIGS. 9 and 10 are graphs for explaining a displacement drift characteristic of a piezoelectric element.
Figure 10:
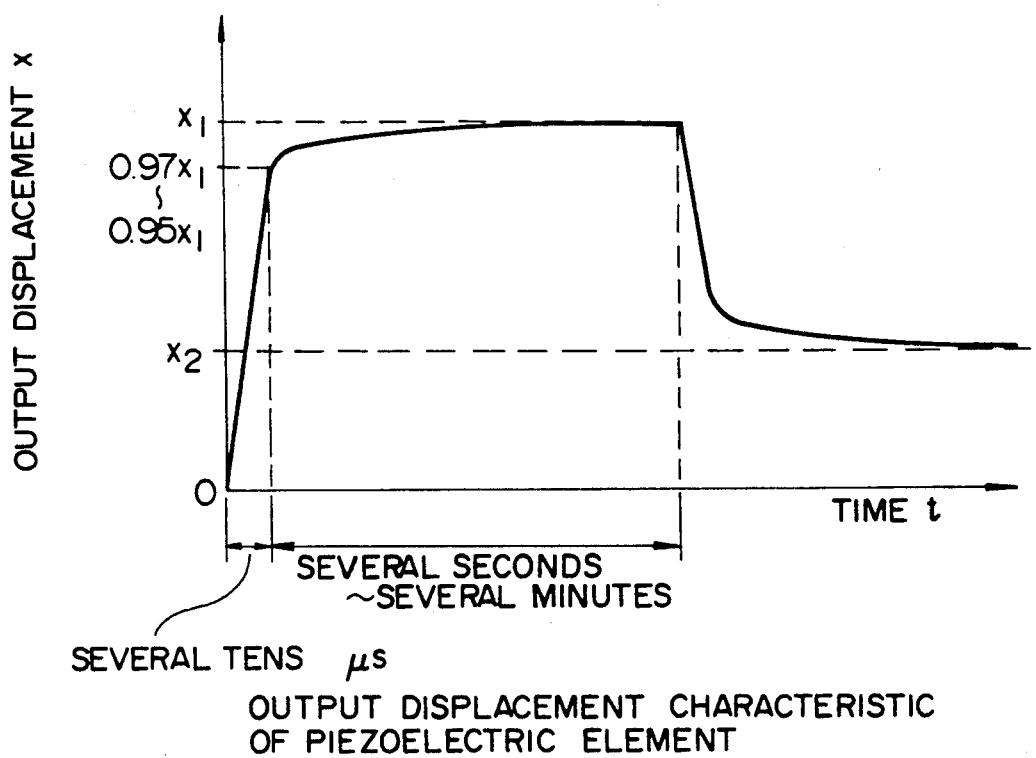

The output displacement produced when a step-like voltage shown in FIG. 9 is applied to a piezoelectric element, particularly, lead zirconate titanate (hereinafter referred to as PZT) which is most widely used as an actuator at present has the so-called "drift characteristic" (or "creep characteristic") wherein the output displacement rises up to more than 90% of the final level in a time on the order of several tens is and then the remaining displacement of several % takes place in a time on the order of several seconds to several minutes, for example, as shown in FIG. 10. The falling characteristic of the output displacement also exhibits a similar drift characteristic shown in FIG. 10.

In the embodiment of FIG. 1, since the position of the data head is intermittently detected from the reference track and correction is made dependent on the resulting off-track amount in a short period of time, there is a possibility that a slight off-track may occur again due to the drift characteristic discussed above.

Figure 11:
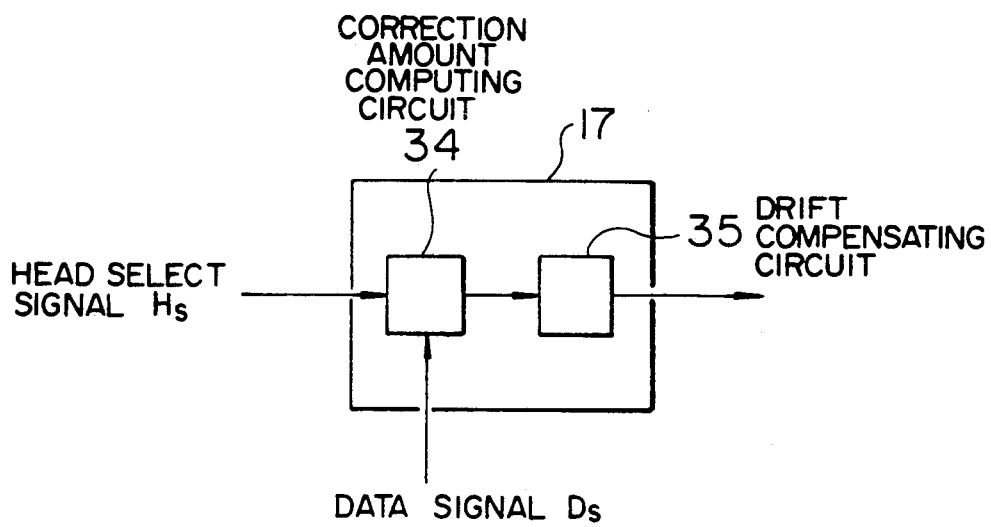
FIG. 11 is a diagram showing a correction amount setting circuit of the present invention.

FIG. 11 shows an embodiment in which a drift compensating circuit is included in the correction amount setting circuit 17 for the purpose of improving the off-track correction accuracy.

The correction amount setting circuit 17 shown in FIG. 11 comprises a correction amount computing circuit 34 adapted to compute the off-track amount (or the correction amount) of the corresponding head based on both the head select signal Hs and a data signal Ds, and a drift compensating circuit 35 adapted to compensate for the drift.

Figure 12:
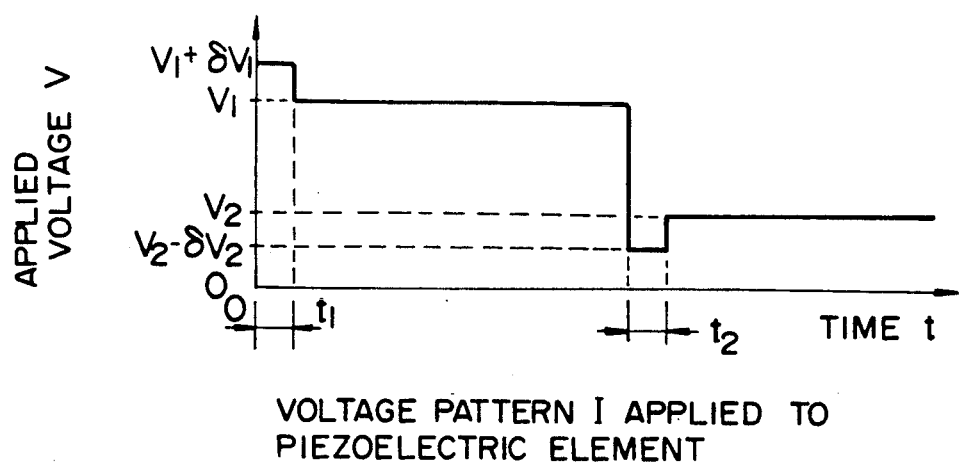
FIGS. 12 through 14 are graphs showing an advantageous effect of a drift compensating circuit of the present invention.

The function of the drift compensating circuit 35 of this embodiment will now be described with reference to FIGS. 12-14. FIG. 12 shows one example of pattern of the output voltage from the drift compensating circuit 35 of this embodiment. In this pattern, at the time of rising, a square-wave voltage ($V_1 + \delta V_1$) relatively higher than a predetermined voltage $V_1$ corresponding to the correction amount $x_1$ is output for a rising moment (a period of time $t_1$ on the order of ms) to initially provide a displacement which includes the amount of drift. Then, at the time of falling, a square-wave voltage ($V_2 - \delta V_2$) relatively lower than a predetermined voltage $V_2$ corresponding to the correction amount $x_2$ is output for a falling moment (a period of time $t_2$ on the order of ms) to initially produce a displacement which similarly includes the amount of drift. Accordingly, the resulting output displacement exhibits a characteristic substantially free from drifts, as shown in FIG. 14.

Figure 13:
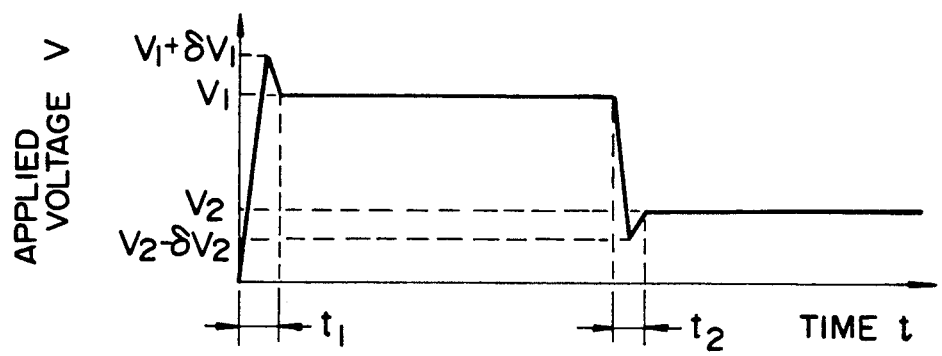
Figure 14:
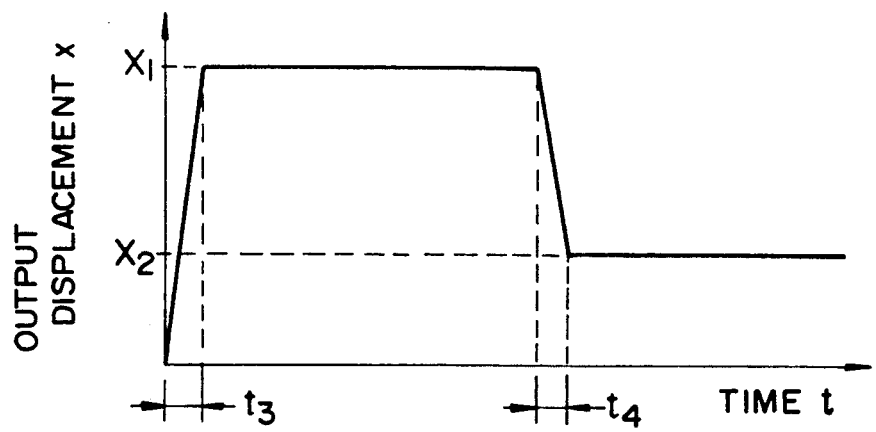

FIG. 13 shows another example of the output voltage pattern obtained from the drift compensating circuit 35 of this embodiment. In this pattern, a relatively higher triangular-wave voltage ($V_1 + \delta V_1$) and a relatively lower triangular-wave voltage ($V_2 - \delta V_2$) are produced at the times of rising and falling, respectively, thereby to similarly eliminate the drifts.

It should be understood that the voltage pattern produced in this embodiment is not limited to the above mentioned two examples. For instance, a trapezoidal-wave voltage with a flat peak may alternatively be applied at the times of rising and falling.

Further, it is to be noted that the drift compensating circuit 35 stores therein optimum applied voltage patterns free from the drifts and dependent on the respective correction amounts and outputs one of the applied voltage patterns dependent on a necessary correction amount.

Figure 15:
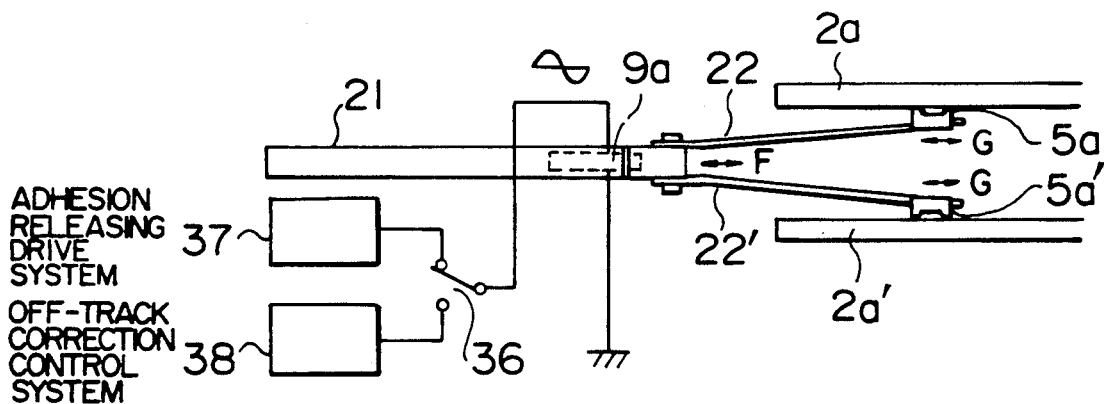
FIG. 15 is a view for explaining an adhesion releasing method as another embodiment of the present invention.

FIG. 15 shows another embodiment of the present invention which is to provide one example of means for releasing adhesion between the disk surface and the head at a start-up of the magnetic disk system. The same reference numerals as those in FIG. 3 designate the same components.

More specifically, during a rest state of the magnetic disk system, the head may adhere or stick to the disk surface because of moisture produced between the heads 5a, 5a' and the disk surfaces 2a, 2a' due to dew condensation or the like therebetween, or the presence of a lubricant on the disk surface. In this state, if the disk is directly rotated at a start up, the head would be subjected to an excessive force and might be damaged.

In this embodiment, therefore, means for driving the piezoelectric element 9a on the guide arm 21 are operated in two different modes at a start-up and during the normal operation. Specifically, the driving means are switched by a selector switch 36 such that an adhesion releasing drive system 37 is operated at a start-up and an off-track correction control system 38 as mentioned above is operated during the normal operation. The adhesion releasing drive system 37 generates a high-frequency voltage to vibrate the piezoelectric element 9a in the directions of arrow F in the drawing, so that the heads 5a and 5a' are finely vibrated in the directions of arrows G via the load arms 22 and 22', respectively. As a result of the fine vibration of the heads, evaporation of the moisture present between the heads and the disk surfaces is accelerated to reduce the adhesion force remarkably. The viscosity of the lubricant present between the heads and the disk surfaces is also lowered by the fine vibration of the heads, resulting in a reduction of the adhesion force.

Thus, the above operating effect makes it possible to achieve an adhesion releasing operation at a start-up of the magnetic disk system.

Figure 16:
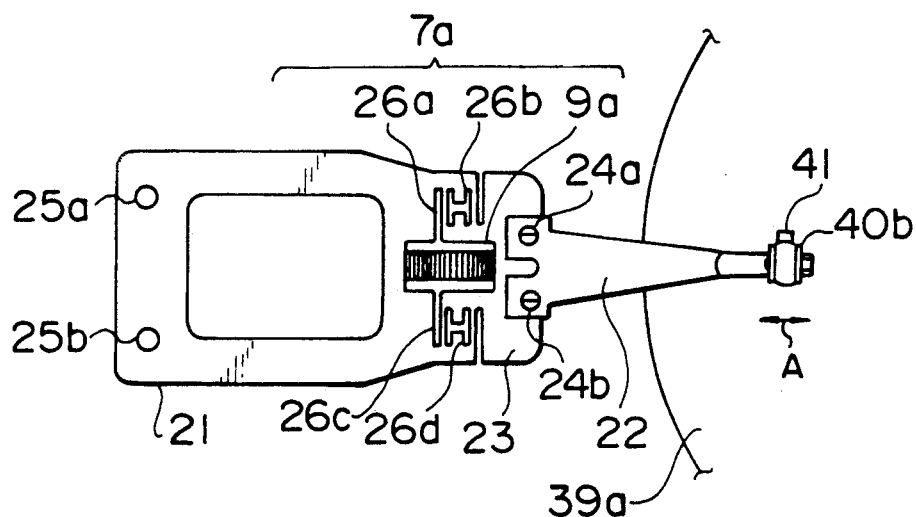
FIGS. 16 and 17 are views, respectively similar to FIGS. 2 and 3, showing still another embodiment in which the present invention is applied to an opto-magnetic disk.
Figure 17:
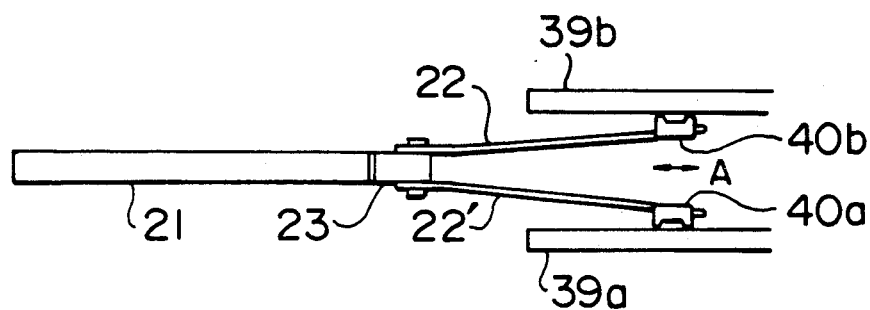
Figure 18:
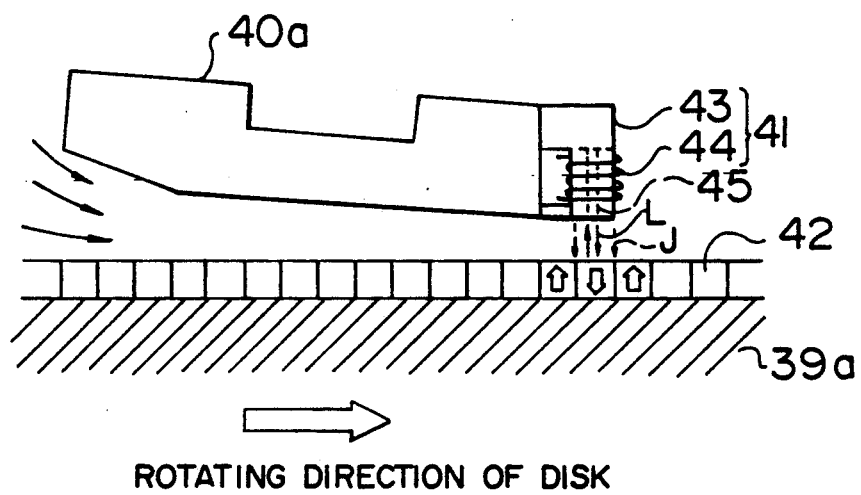
FIG. 18 is a view for explaining the detailed operation of an opto-magnetic head.

Next, FIGS. 16, 17 and 18 are views for explaining still another embodiment of this embodiment in which the present invention is applied to an optical disk system. FIGS. 16 and 17 correspond to FIGS. 2 and 3, respectively. The reference numerals the same as those in FIGS. 2 and 3 designate the same components.

Particularly, this embodiment is applied to a reloadable opto-magnetic disk system in which a subminiature optical element utilizing a semiconductor laser is incorporated in a head. In FIGS. 16 and 17, designated by 39a and 39b are opto-magnetic disks each having a thin magnetic film medium coated on its surface, 40a and 40b are sliders, and 41 is an opto-magnetic head.

FIG. 18 is a view showing a floating state of the slider 40a and details of the opto-magnetic head 41 during rotation of the optical disk. Designated by 39a is the optical disk, 42 is the thin magnetic film medium, 43 is an optical element, and 44 is a magnetic coil, the last two components 43 and 44 jointly constituting the optical head 41. A laser beam is projected and received (as indicated by arrows L) by the element 43 through an optical path 45 provided to extend through the magnetic coil 44. The principles of operation are as follows. The laser beam condensed to the diameter on the order of 1 $\mu$m is irradiated to the thin magnetic film medium to locally raise a temperature thereof, while a magnetic field is applied (as indicated by arrows J) by the magnetic coil 44 to reverse the direction of magnetization for recording or erasing information. When producing the information, rotation of the polarizing plane of the light reflected by the medium is detected using the so-called Kerr effect as a result of interaction between the light and the magnetic field. In this embodiment, the subminiature opto-magnetic head of slider mounting type is achieved by integrating the subminiature optical element and the magnetic coil together.

Accordingly, as in the foregoing embodiments of the magnetic disk system, each data head can finely be driven by the piezoelectric element 9a mounted on the distal end of the guide arm 21 to achieve a correction of an off-track.

It is needless to say that, although the opto-magnetic head is illustrated by way of example in FIG. 18, the present invention is also applicable to an optical disk system utilizing an optical head which can record and reproduce information by only an optical element mounted on a slider.

Figure 19:
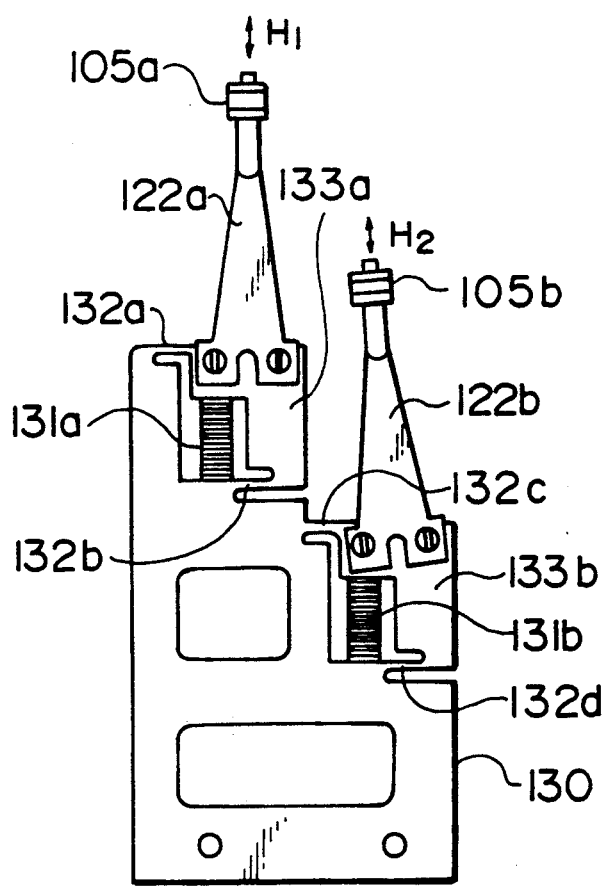
FIG. 19 is a view showing a still another embodiment of the opto-magnetic head.

FIG. 19 shows an embodiment in which the guide arm has a plurality of heads and piezoelectric elements are provided to drive the respective heads independently of one another. Leaf springs as a resilient means for holding each piezoelectric element are constituted by uneven parallel leaf springs as in the embodiment of FIG. 8.

More specifically, for finely driving a plurality of heads 105a and 105b and a plurality of load arms 122a and 122b, a pair of laminated piezoelectric elements 131a and 131b are disposed between the guide arm 130 and L-shaped distal end portions 133a and 133b of the guide arm, respectively. In addition, two pairs of uneven parallel leaf springs 132a and 132b and 132c and 132d are provided so as to restrict the distal end portions 133a and 133b of the guide arm in respect of their movements, respectively. By applying voltages to the respective laminated piezoelectric elements 131a and 131b to develop their displacements, the heads 105a and 105b can finely be driven in the directions of arrows H₁ and H₂.

Although the laminated piezoelectric elements 131a and 131b are arranged parallel to each other in this embodiment, the mounting direction of the laminated piezoelectric element 131b and the extending direction of the uneven parallel leaf springs 132c and 132d may properly be inclined dependent on the direction normal to the recording track at the corresponding head position.

With this embodiment, therefore, even for the head arm having a plurality of heads, the mechanism of finely driving the heads can be realized with high rigidity and compact structure.

Figure 20:
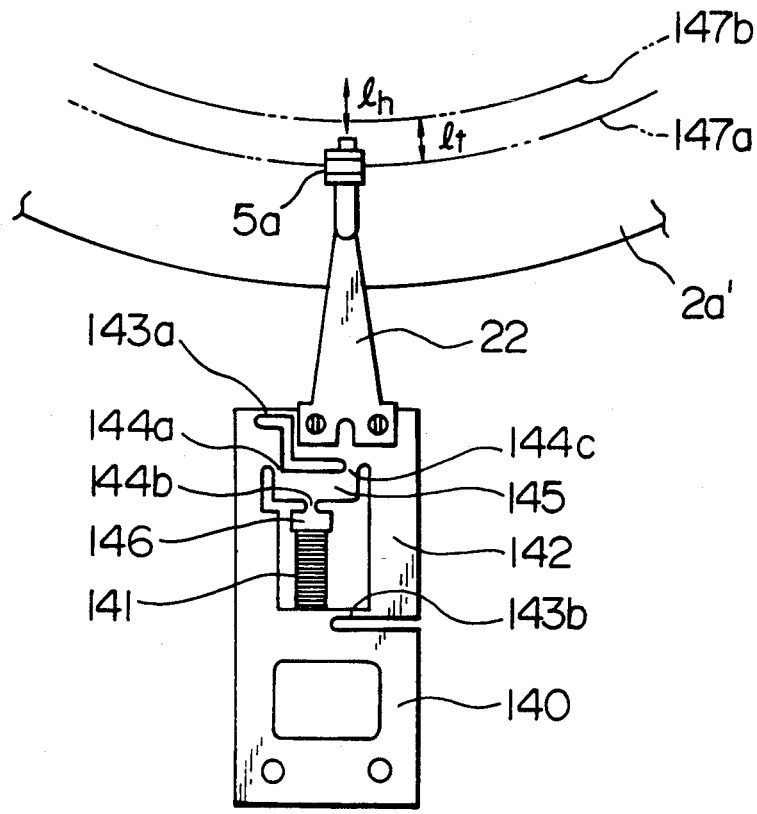
FIGS. 20 through 23 are views for explaining further embodiments of the present invention, respectively.

Next, FIG. 20 shows a still further embodiment in which a mechanism for magnifying a displacement of the piezoelectric element is provided integrally with the guide arm.

More specifically, an L-shaped distal end portion 142 of a guide arm 140 to which a head 5a and a load arm 22 are attached is connected to the guide arm 140 via uneven parallel leaf springs 143a and 143b, as in the embodiment of FIG. 19, so as to be restricted and guided thereby for movement. The head 5a is finely driven by a piezoelectric element displacement magnifying mechanism which comprises a laminated piezoelectric element 141 fixedly bonded between a unit of a lever 145 and a holder block 146 and guide arm 140, the lever 145 having resilient hinges 144a, 144b and 144c.

The displacement magnifying factor B in this case corresponds to the so-called lever ratio of $l_1/l_2$ which is determined by a spacing $l_1$ between the resilient hinges 144a and 144c and a spacing $l_2$ between the resilient hinges 144a and 144b. Usually, the factor B of 5-6 times is sufficiently feasible in practical use. Accordingly, when a laminated piezoelectric element producing a displacement of 4-5 μm is employed in this embodiment, the head can be driven in a fine stroke $l_h$ of 20-30 μm.

Meanwhile, a spacing it between adjacent tracks 147a and 147b recorded on the disk 2a' is about 17 μm for the track density of 1500 TPI (tracks per inch), for example. In the case of higher track density, the track-to-track spacing becomes below 10 μm.

With this embodiment, therefore, the head can be moved over one track or several tracks solely by the fine driving mechanism provided on the head arm, enabling the seek operation to be performed at a very high speed.

Further, by using the above fine driving mechanism to make a following operation of the track, it is possible to achieve the following operation with good followability and high accuracy.

Figure 21:
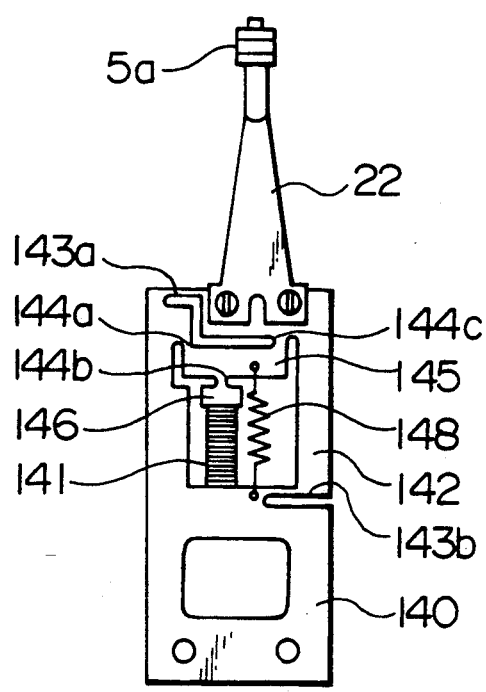

FIG. 21 shows another embodiment which incorporates a displacement magnifying mechanism similar to that shown in FIG. 20. In FIG. 21, reference numerals the same as those in FIG. 20 designate the same components.

In the case of using the displacement magnifying mechanism, since the distal end portion 142 of the guide arm develops a relatively large displacement, the leaf springs 143a and 143b are required to have reduced thicknesses. Accordingly, a sufficient degree of preload cannot be imparted to the piezoelectric element, leading to a possibility that a problem may arise in durability and reliability of the piezoelectric element and the bonded portion thereof.

To avoid such a problem, in this embodiment, the lever 145 and the guide arm 140 are connected with each other by a tension spring 148 as a compressive force applying mechanism, so that a compressive force is imparted to the piezoelectric element 141 at all times. With this embodiment, therefore, it is possible to improve durability and reliability of the piezoelectric element and the bonded portion thereof.

Figure 22:
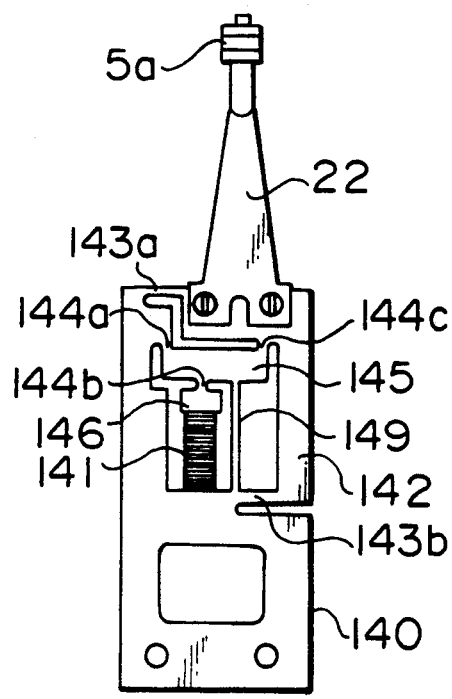

FIG. 22 shows still another embodiment which incorporates a displacement magnifying mechanism similar to that shown in FIG. 21. In FIG. 22, reference numerals the same as those in FIG. 21 designate the same components.

In this embodiment, a beam member (compression beam) 149 machined to be integral with the guide arm 140 is used as a compressive force applying mechanism which imparts a compressive force to the piezoelectric element. More specifically, based on the principles explained in detail by referring to FIG. 4, when the piezoelectric element 141 is bonded at a high temperature and then cooled to the normal temperature, a compressive force is imparted to the piezoelectric element 141 due to a difference in thermal expansion between the piezoelectric element 141 and the compression beam 149 made of an aluminum alloy. Note that the length and cross-sectional area of the compression beam 149 are appropriately set based on the force produced by the piezoelectric element, rigidities of the respective components, and other parameters.

With this embodiment, it is possible to realize the compressive force applying mechanism with a simple and compact structure.

Figure 23:
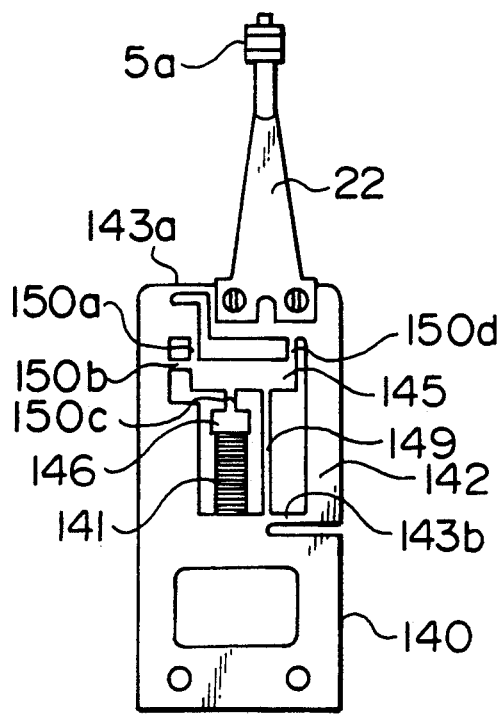

FIG. 23 shows still another embodiment which incorporates a displacement magnifying mechanism and a compressive force applying mechanism both similar to those sown in FIG. 22. In FIG. 23, reference numerals the same as those in FIG. 22 designate the same components.

In the foregoing embodiments, the resilient hinges 144a, 144b and 144c are used as the fulcrums of the displacement magnifying mechanism and the force transmitting portions. But, when the displacement is large, the bending stresses imposed on the resilient hinge portions is increased, which may degrade durability and reliability. In view of the above, this embodiment uses, instead of resilient hinges, leaf springs 150a, 150b, 150c and 150d constitute the fulcrums of the displacement magnifying mechanism and the force transmitting portions. More specifically, the leaf springs 150a and 150b arranged in perpendicular relation support the lever 145 in such a manner as to restrict its movement in the directions of translation thereof but to allow rotation thereof, while the leaf springs 150c and 150d serve as the force transmitting portion from the piezoelectric element 141 and the force transmitting portion from the distal end portion 142 of the guide arm, respectively. This arrangement is effective to reduce the bending stresses imposed on the fulcrums and the force transmitting portions.

With this embodiment, therefore, it is possible to achieve the mechanism for finely driving the head which incorporates both the displacement magnifying mechanism and the compressive force applying mechanism and has high durability and reliability.

Although the above explanation has been made by referring to the embodiments using disks as information recording media, the information recording media are not limited to the disks. The present invention is also applicable to the case of recording information on card-like, sheet-like, and other type information recording media, or, reproducing the information recorded on such media.

As fully described above, the present invention can provide an information recording device or a disk system which provides a function of enabling a fine displacement of the head and is more practical with a high reliability. Furthermore, according to the present invention, since the fine displacement actuator is formed on the head support, a compact device or unit can be achieved. In addition, the fine displacement actuator is disposed on the head support associated with each of the plural disks so as to permit independent adjustment of the head positions, whereby the respective heads can be positioned with high accuracy.

What is claimed is:

1. A disk system comprising a plurality of disks for recording information, a plurality of guide arms, a plurality of heads mounted on said plurality of guide arms for recording or reproducing information on or from respective disk surfaces of said plurality of disks, a main actuator for simultaneously driving said plurality of guide arms to simultaneously drive said plurality of heads in a long stroke, a plurality of sub-actuators for driving at least two of said plurality of heads in fine strokes independently of one another, and means for correcting respective offsets of said plurality of heads with said plurality of sub-actuators based on position information recorded on said respective disk surfaces and reproduced by said plurality of heads and actual position information indicative of actual positions of said plurality of heads, wherein each of said plurality of sub-actuators includes a piezoelectric element mounted on an associated one of said plurality of guide arms and resilient means for restricting movement of said piezoelectric element having low rigidity in a driving direction of said piezoelectric element and high rigidity in other directions, and wherein a distal end portion of each of said plurality of guide arms is divided in a direction of a thickness thereof to form upper and lower head mounting portions on which respective ones of said plurality of heads are mounted to form upper and lower head's, and wherein respective piezoelectric elements and respective resilient means are mounted on said upper and lower head mounting portions for driving said upper and lower heads in fine strokes independently on each other.

2. A disk system, comprising a plurality of disks for recording information, a plurality of guide arms, a plurality of heads mounted on said plurality of guide arms for recording or reproducing information on or from respective disk surfaces of said plurality of disks, a main actuator for simultaneously driving said plurality of guide arms to simultaneously drive said plurality of heads in a long stroke, a plurality of sub-actuators for driving at least two of said plurality of heads in fine strokes independently of one another, and means for correcting respective offsets of said plurality of heads with said plurality of sub-actuators based on position information recorded on said respective disk surfaces and reproduced by said plurality of heads and actual position information indicative of actual positions of said plurality of heads, wherein each of said plurality of sub-actuators includes a piezoelectric element mounted on an associated one of said plurality of guide arms and resilient means for restricting movement of said piezoelectric element having low rigidity in a driving direction of said piezoelectric element and high rigidity in other directions, and wherein said disk system further comprises a single amplifier for generating a respective voltage for each piezoelectric element of said plurality of sub-actuators and a piezoelectric element selector switch for supplying the respective voltage to said each piezoelectric element.

3. A disk system according to claim 2, wherein the respective voltage is supplied to said each piezoelectric element via a respective charge holder circuit.

4. A disk system according to claim 3, wherein said respective charge holder circuit includes a capacitor connected in parallel with said each piezoelectric element.

5. A disk system comprising a plurality of disks for recording information, a plurality of guide arms, a plurality of heads mounted on said plurality of guide arms for recording or reproducing information on or from respective disk surfaces of said plurality of disks, a main actuator for simultaneously driving said plurality of guide arms to simultaneously drive said plurality of heads in a long stroke, a plurality of sub-actuators for driving at least two of said plurality of heads in fine strokes independently of one another, and means for correcting respective offsets of said plurality of heads with said plurality of sub-actuators based on position information recorded on said respective disk surfaces and reproduced by said plurality of heads and actual position information indicative of actual positions of said plurality of heads, wherein each of said plurality of sub-actuators includes a piezoelectric element mounted on an associated one of said plurality of guide arms and resilient means for restricting movement of said piezoelectric element having low rigidity in a driving direction of said piezoelectric element and high rigidity in other directions, and wherein said disk system further comprises means for supplying a high-frequency voltage to each piezoelectric element of said plurality of sub-actuators at a start-up of said disk system to vibrate said plurality of heads to release adhesion between said plurality of heads and said respective disk surfaces.

* * * * *